US010726200B2

(12) United States Patent
Chou

(10) Patent No.: US 10,726,200 B2
(45) Date of Patent: Jul. 28, 2020

(54) SYSTEMS AND METHODS FOR USER INTERFACES THAT PROVIDE ENHANCED VERIFICATION OF EXTRACTED DATA

(76) Inventor: Benjamin Chou, Fountain Valley, CA (US)

( * ) Notice: Subject to any disclaimer, the term of this patent is extended or adjusted under 35 U.S.C. 154(b) by 0 days.

(21) Appl. No.: 13/158,310

(22) Filed: Jun. 10, 2011

(65) Prior Publication Data

US 2012/0203676 A1 Aug. 9, 2012

Related U.S. Application Data

(60) Provisional application No. 61/439,774, filed on Feb. 4, 2011.

(51) Int. Cl.
| | |
|---|---|
| *G06K 7/10* | (2006.01) |
| *G06Q 40/02* | (2012.01) |
| *G06K 7/14* | (2006.01) |
| *G06K 9/20* | (2006.01) |
| *G06Q 40/00* | (2012.01) |
| *G06F 40/18* | (2020.01) |
| *G06F 40/117* | (2020.01) |

(52) U.S. Cl.
CPC ............ *G06F 40/18* (2020.01); *G06F 40/117* (2020.01); *G06K 7/1473* (2013.01); *G06K 9/20* (2013.01); *G06Q 40/02* (2013.01); *G06K 7/1404* (2013.01); *G06Q 40/12* (2013.12)

(58) Field of Classification Search
CPC ..................................................... G06Q 40/02
See application file for complete search history.

(56) References Cited

U.S. PATENT DOCUMENTS

| | | | | |
|---|---|---|---|---|
| 5,235,654 A | * | 8/1993 | Anderson ............ | G06K 9/2054 382/180 |
| 5,324,131 A | * | 6/1994 | Gardner .................. | B43K 8/02 401/196 |
| 5,757,383 A | * | 5/1998 | Lipton .................. | G06F 17/214 345/442 |
| 6,400,845 B1 | * | 6/2002 | Volino ................. | G06K 9/2054 358/462 |
| 6,683,697 B1 | * | 1/2004 | Lech .................. | G06K 9/00442 358/1.15 |
| 6,991,158 B2 | * | 1/2006 | Munte ........................... | 235/379 |
| 7,659,890 B2 | * | 2/2010 | Simmons ............ | G06F 3/04812 345/156 |
| 7,836,394 B2 | * | 11/2010 | Linder .......................... | 715/234 |
| 2002/0143811 A1 | * | 10/2002 | Bennett ........................ | 707/503 |

(Continued)

OTHER PUBLICATIONS

Curtis D. Frye, "Step by Step Microsoft Office Excel 2007", pp. 106-112. (Year: 2007).*

(Continued)

*Primary Examiner* — Elizabeth H Rosen
*Assistant Examiner* — Claire A Rutiser
(74) *Attorney, Agent, or Firm* — Ansari Katiraei LLP

(57) ABSTRACT

A computer software that provides the user with the means to import an image of a paper financial document for data extraction. The extracted data automatically populates a financial datasheet and can be synchronized with a company financial record being kept on an external accounting software. The present invention provides the user with the convenience of automatic data input and eliminates the traditional method of individually inputting financial transactions into the accounting software.

10 Claims, 16 Drawing Sheets

(56) References Cited

U.S. PATENT DOCUMENTS

| | | | |
|---|---|---|---|
| 2002/0191867 A1* | 12/2002 | Le .................. | G06F 3/0485 |
| | | | 382/300 |
| 2005/0278249 A1* | 12/2005 | Jones et al. .................. | 705/38 |
| 2007/0237128 A1* | 10/2007 | Patel et al. .................. | 370/351 |
| 2007/0237427 A1* | 10/2007 | Patel et al. .................. | 382/305 |
| 2007/0244775 A1* | 10/2007 | Linder .................. | 705/35 |
| 2008/0063278 A1* | 3/2008 | Vincent .................. | G06K 9/00463 |
| | | | 382/182 |
| 2008/0133411 A1* | 6/2008 | Jones et al. .................. | 705/42 |
| 2009/0327321 A1* | 12/2009 | McCormack .................. | G06F 16/258 |
| 2011/0087581 A1* | 4/2011 | Ram et al. .................. | 705/37 |
| 2011/0182500 A1* | 7/2011 | Esposito .................. | G06F 3/04886 |
| | | | 382/159 |
| 2011/0258113 A1* | 10/2011 | Jones et al. .................. | 705/39 |

OTHER PUBLICATIONS

David Nelson, "Microsoft Excel 2008 Basics", dated Apr. 15, 2009 (Year: 2009).*

Borstein, "Better PDF OCR. ClearScan is smaller, looks" Web blog downloaded Apr. 22, 2020 from betterhttps://blogs.adobe.com/acrolaw/2009/05/better_pdf_ocr_clearscan_is_smal/ (Year: 2009).*

* cited by examiner

| Transaction Data Field | Required For | Optional For |
|---|---|---|
| Bank Account | Check, Bill Payment, Deposit | |
| Account Code | Check, Bill, Bill Payment, Deposit, and Credit Card Charge/Refund | |
| Amount | Check, Bill, Deposit, Credit Card Charge/Refund | |
| Date | Check, Bill, Bill Payment, Deposit, and Credit Card Charge/Refund | |
| Customer, Vendor, Employee or Other Names | Bill, Bill Payment, Deposit | Check, Credit Card Charge/Refund |
| Description of Memo | | All |

FIG. 16

SYSTEMS AND METHODS FOR USER INTERFACES THAT PROVIDE ENHANCED VERIFICATION OF EXTRACTED DATA

The current application claims a priority to the U.S. Provisional Patent application Ser. No. 61/351,579 filed on Jun. 10, 2010 and the U.S. Provisional Patent application Ser. No. 61/439,774 filed on Feb. 4, 2011.

FIELD OF THE INVENTION

The present invention relates generally to a software application for the processing and record keeping of paper financial documents. More specifically, the present invention provides users with the ability to scan financial and automatically recognize financial transaction data on the paper financial documents for the synchronization with their accounting software.

BACKGROUND OF THE INVENTION

Bookkeeping is defined as the recording of financial transactions. Depending on the structure of a corporation, U.S. tax laws exist that require individuals and business owners to provide proof of financial transactions when requested. A strong accounting system and accurate bookkeeping is necessary for business entities to avoid tax-related penalties.

Due to the complexity of the bookkeeping process required for maintaining a strong accounting system, skilled professionals such as a bookkeeper or accountant are often hired to fulfill this role for a business entity. With the gradual sophistication of accounting software available, computerized bookkeeping has become the industry standard. A number of accounting software programs exist to fulfill the needs of a corporation, with the more sophisticated software programs addressing larger corporations. Regardless of the sophistication level of the software however, users of these software solutions are still required to manually enter financial transaction data. Financial transactions fall into the categories of income statement accounts (i.e. income accounts, expense accounts) and balance sheet accounts (i.e. Accounts Receivable and assets, Accounts Payable and liabilities, equity). The combination of income statement accounts and balance sheet accounts comprise the complete record keeping of financial activity inflow and outflow for a business entity. For each financial transaction to be recorded correctly there is a minimum amount of data fields that are required, and many software programs have taken this into consideration. This minimum is thus reflectively defined depending on the particular accounting software used.

The bookkeeping process involves recognition of the type of document, which include physical documents that vary in paper size, data density, and data location as well as electronic versions of these documents. Once the type of document and therefore the corresponding financial transaction types for that document are identified, a single or multiple financial transactions can be correctly posted. Each financial transaction has a set number of different data fields that need to be entered. For example, an invoice that a business would send to a customer requires a date of the invoice, an amount of monetary funds due, the name of the paying customer, and the account code that matches the type of income the business is receiving. The data fields fall in two categories, those that are a direct transcription from the financial document, such as amounts, dates, names, and those that are supplemented by a bookkeeper, such as account codes, memo fields, references numbers, and breakdown between principal and interest, taxable and nontaxable amounts, and other such categorization. Complete data entry of financial transactions involves more than directly transcribing any relevant financial transaction data from the corresponding financial document. However, much of the manual data entry that is done by the bookkeeper can be automated by software.

BRIEF DESCRIPTION OF THE DRAWINGS

FIG. 6 shows the data preview pane being automatically populated from the reading and processing of the image data by the present invention. The pane allows the users of the present invention to verify, edit, and modify data if needed via formulas and comparisons of populated data against the image.

Figure 8:
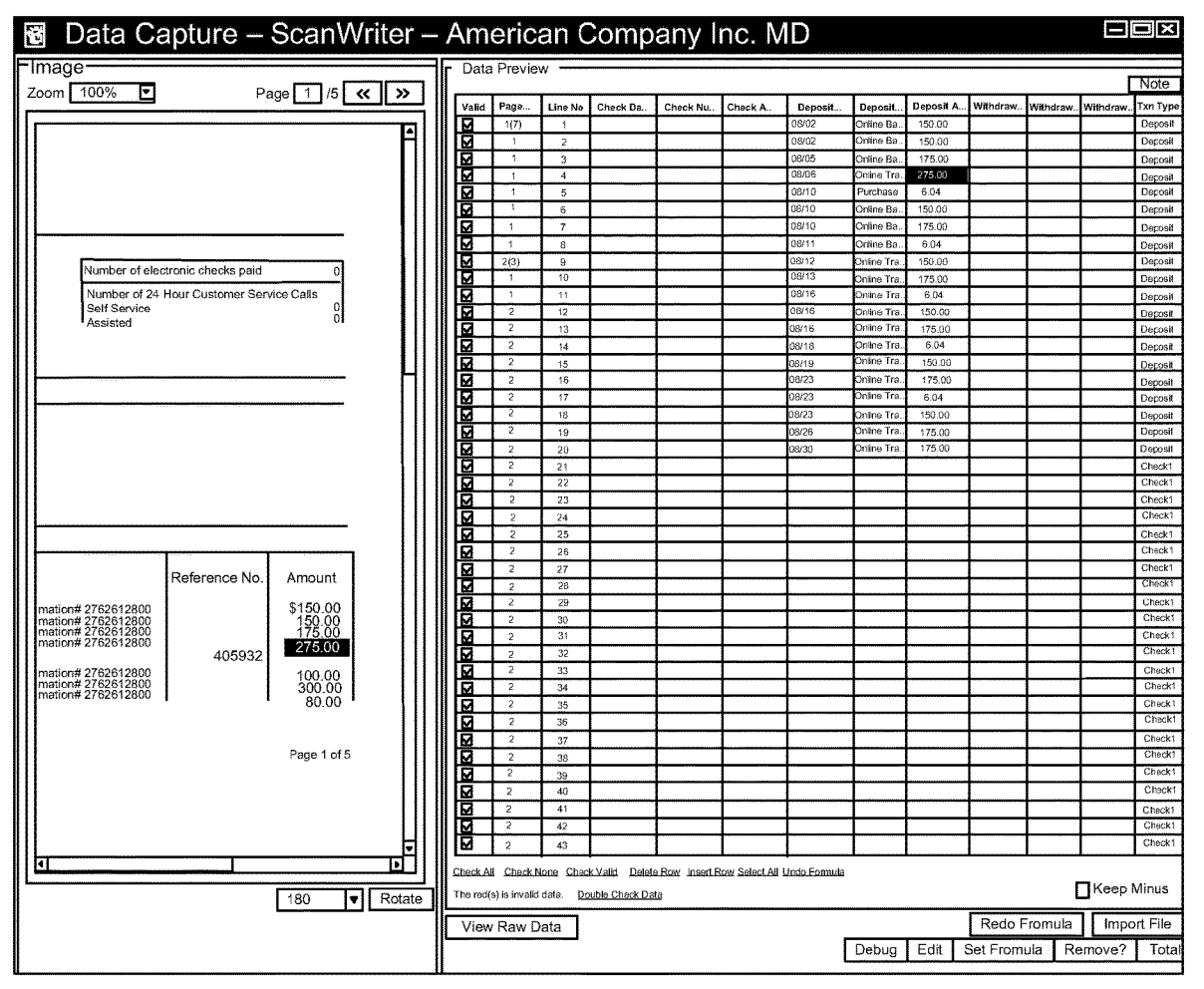

FIG. 8 shows a selected data cell highlighting the area on the image data where the data is extracted from.

FIG. 9 shows the present invention's ability to separate the financial transaction data into specific types of transactions. The tabs allow the user of the present invention to view the different types of financial transactions separately. Provided that the financial transaction data is accurate, the data preview pane provides the user with the means to export the financial data sheet.

FIG. 13 shows the user referencing a specific financial transaction and utilizing the present invention to identify the area on the associated image data of the paper financial document where the data is extracted from.

FIG. 15 shows the present invention providing the users with the means to compare the extracted data side by side with the image data in the display pane. If necessary, user can modify data as well via edit button in the display pane.

FIG. 16 is a table showing the common transaction data field requirements and their requirement status for the transaction type.

DETAIL DESCRIPTIONS OF THE INVENTION

All illustrations of the drawings are for the purpose of describing selected versions of the present invention and are not intended to limit the scope of the present invention.

The bookkeeping process of the present invention for posting a financial transaction in an accounting software program involves posting the transaction type and posting the relevant transaction details. The minimum amount of relevant transaction details are predefined depending on the choice of the accounting software. However, if the user is not using external accounting software, then the minimum requirement of relevant transaction details do not apply. In reference to FIG. 16, an example table of the types of transaction data is required for specific transaction types. These requirements status are dependent on the choice of accounting software. As shown in FIG. 16, a check transaction requires the bank account, account code, the monetary amount, and the date of the transaction. The name of the receiver and the memo of the check are optional data fields are not required.

Figure 1:
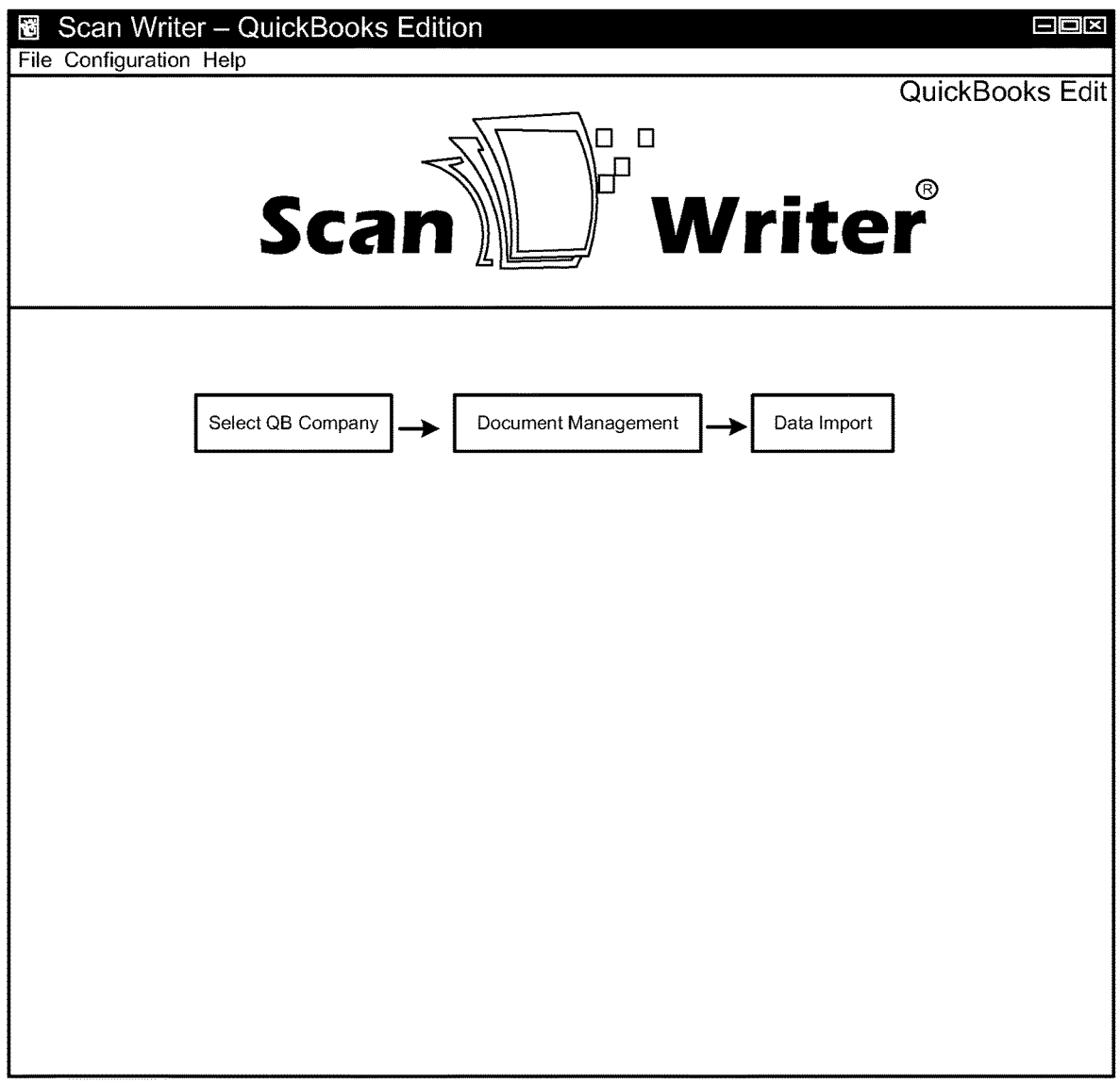
FIG. 1 is the initial homepage of the user interface for the present invention.

The software of the present invention provides the user with the ability to import an image of a paper financial document for automatic extraction of financial transaction data. In reference to FIG. 1, the present invention first displays and introduces the user to a home screen. The home screen displays a general flow of document recording instructions to properly use the present invention. The first option for the user in the bookkeeping process is to select a financial record for a company. In reference to FIG. 2, the software of the present invention displays a selection menu of a plurality of company financial records and provides for the means to select and a company financial record to edit. The selections menu additionally provides the users with the means to add and remove company financial records. In the case the user is required to keep track of financial transactions of a new company, the user is able to create a new company financial record by activating an add button on the selection menu. In the case the user is not required to keep track of the financial transactions of an existing company, the user is able to remove the existing company from the selections menu by a remove button. However, if an existing company financial record is required to be updated, the user is able to select the company financial records displayed to be loaded.

Figure 2:
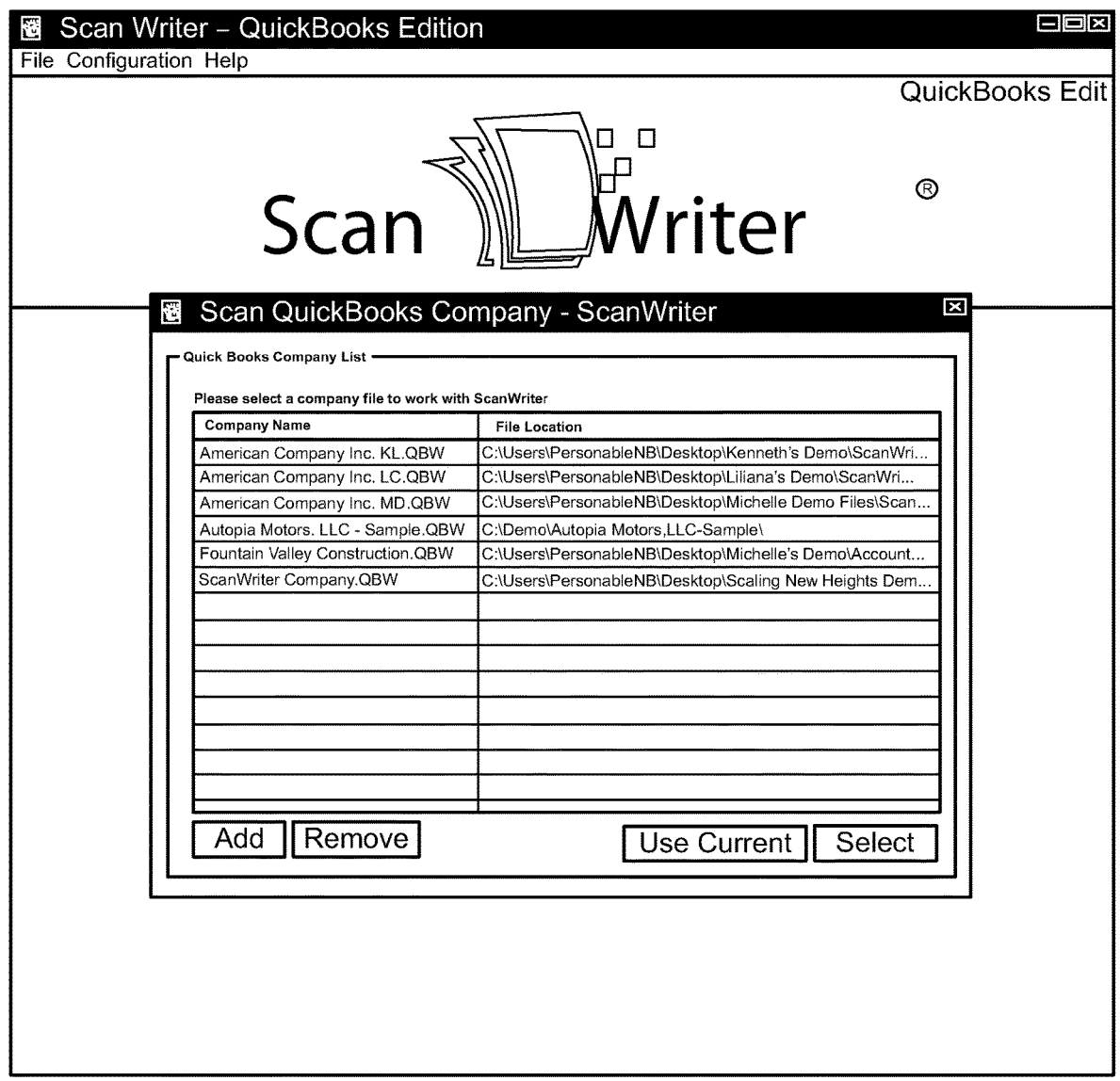
FIG. 2 is the selection menu for the loading of a company financial record.
Figure 3:
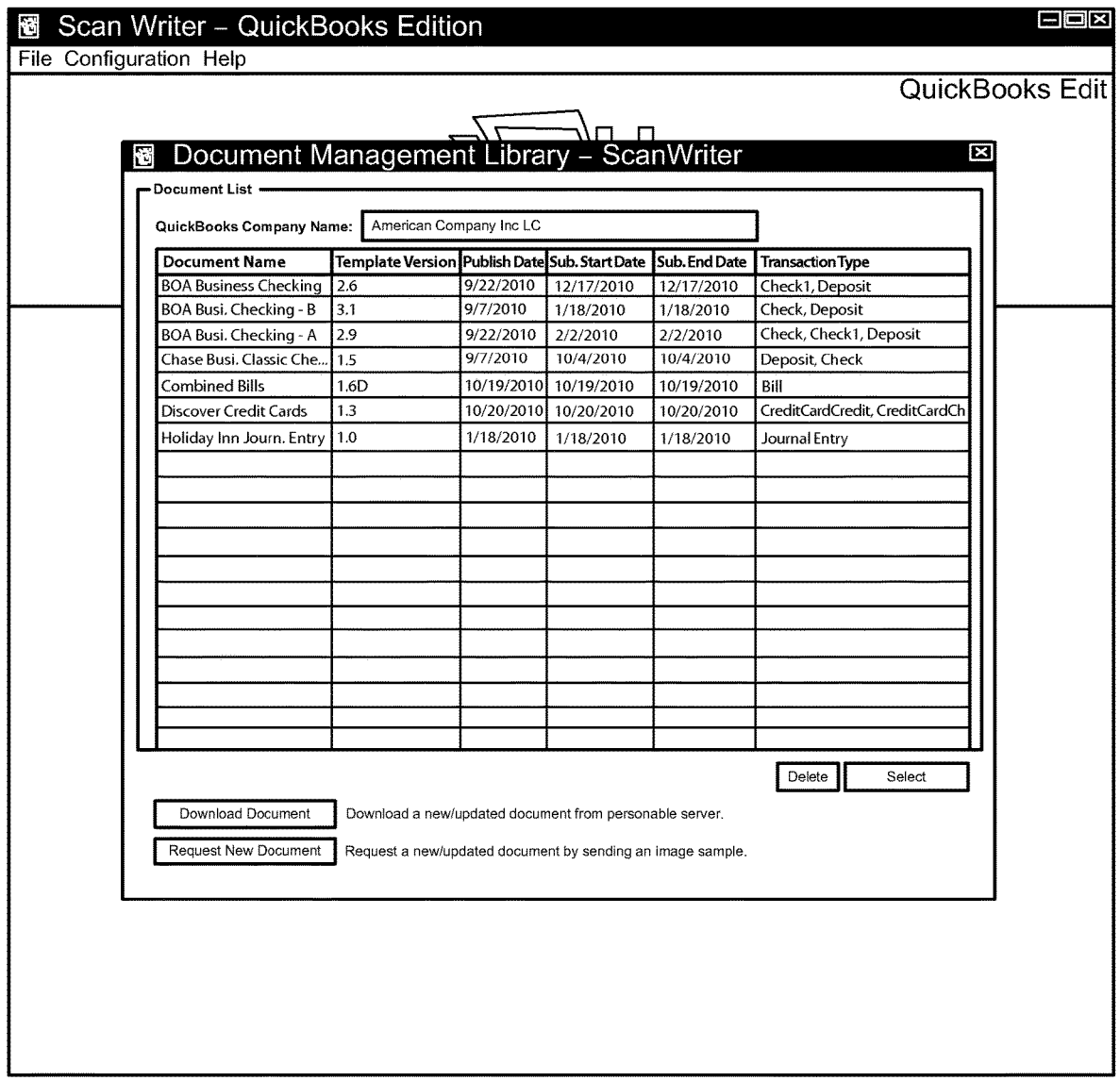
FIG. 3 is the selection menu for the selection of the type of template to be used for a paper financial document.

In reference to FIG. 2, once the user selects and loads a company financial record, the user is able to update the company financial records in the external accounting program through the present invention. Providing a physical paper financial document, the user is able to scan the paper financial document with a computer input device such as a document scanner. However, before scanning the paper financial document, the user is presented with a template selection menu. The template selection menu displays a plurality of document templates for the user to select, as shown in FIG. 3. The selection of the document template allows for the software of the present invention to properly recognize and gather the needed data from a scanned financial document. In the preferred embodiment of the present invention, the templates of various types of documents can be downloaded from a main server. As companies providing any types of financial documents update the formatting of their paper financial documents, the main server will also update the corresponding templates for the paper financial documents. In the case a template is non-existent for a paper financial document, the user is provided with the means to request a new document template. To request a new document template, the user is able to upload an image of the paper financial document to the main server. The template for the document will then be created and stored in the main server for download and future use.

Figure 4:
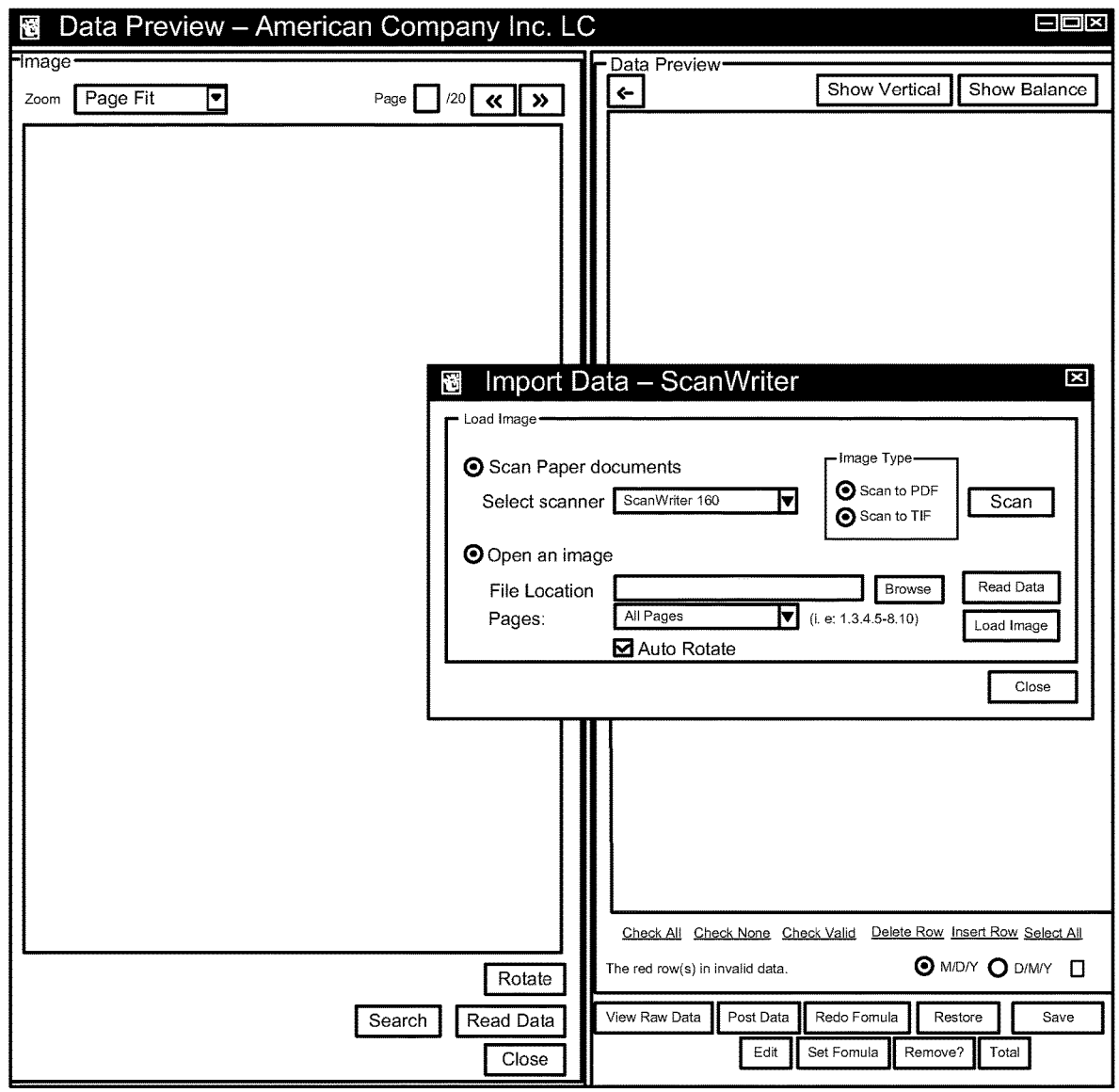
FIG. 4 shows the import sources for the image data of the paper financial document. The user can choose to use a scanner or import an existing image of a paper financial document.

In reference to FIG. 4, the computer input device is a device that is able to input image data of the physical paper financial document into the computer-readable medium. The present invention provides the user with an import interface where the paper financial document can be imported by means of the computer input device or by means of loading existing image data stored in an existing database. The existing database can be the user's own computer storage, where they were able to download an image of their financial documents from emails, online financial accounts, or an online fax. When utilizing the computer input device, the import interface provides the user with the ability to select the desired computer input device and with the option to scan the paper financial documents into a desired electronic format. When importing the existing image data of financial documents, the import interface provides the user with the ability to browse through the existing database to find the file of the image data. If the image data consists of a plurality of pages, the import interface also provides the user with a selection menu to select the page of the image data to be imported. After being imported into the software of the present invention, the image data of the paper financial document is displayed in a viewing pane. In the case the image data is improperly or incompletely imported the present invention will display an error sign prompting the user to re-import the image data of the paper financial document. However, if the image data of the paper financial document is properly imported, the present invention will notify and confirm with the user of the successfully importation. With a successful importation, the present invention is able to automatically process the image data for the extraction of financial transaction data.

Figure 5:
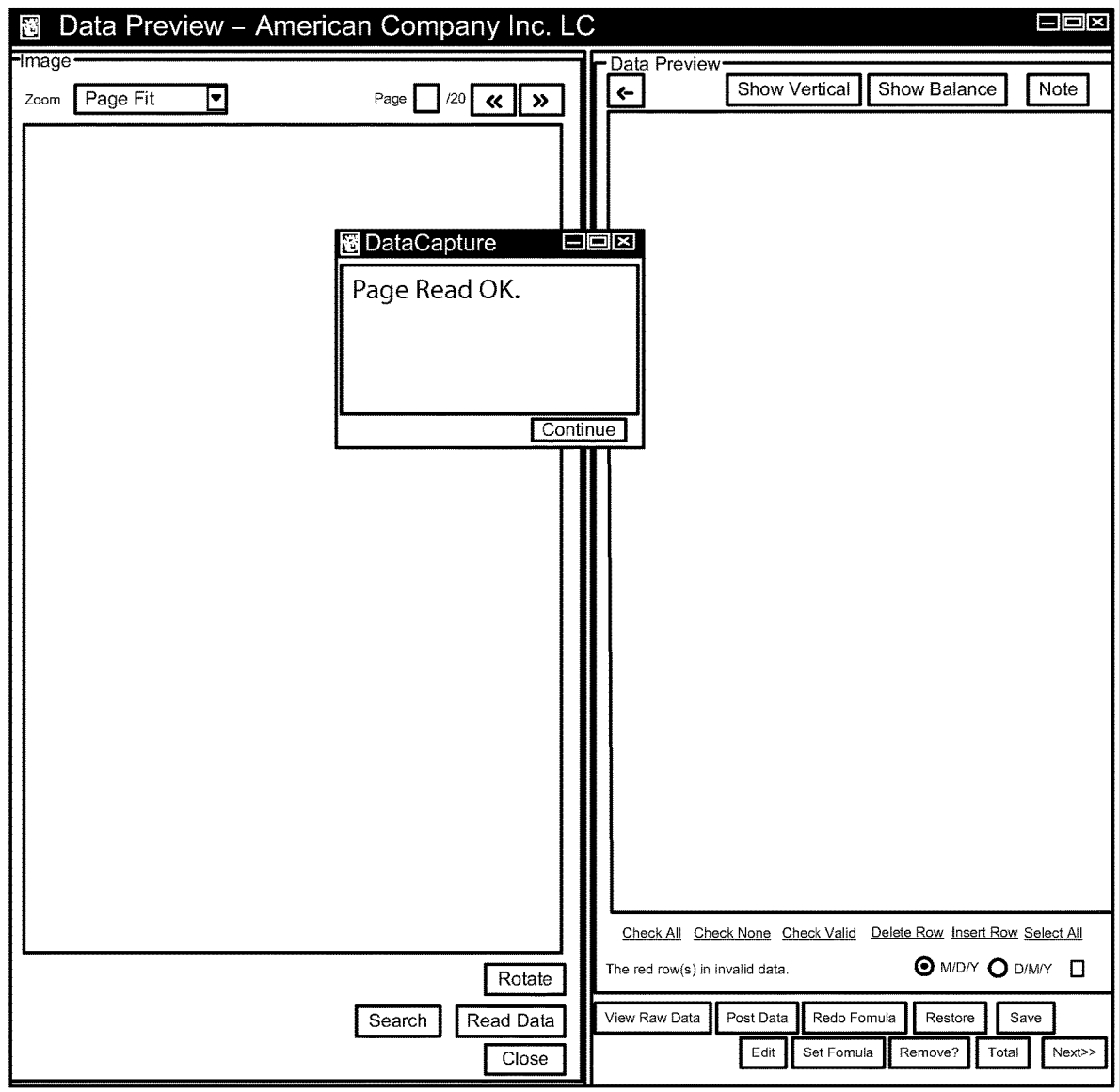
FIG. 5 shows the confirmation of a successful read of an image data.
Figure 6:
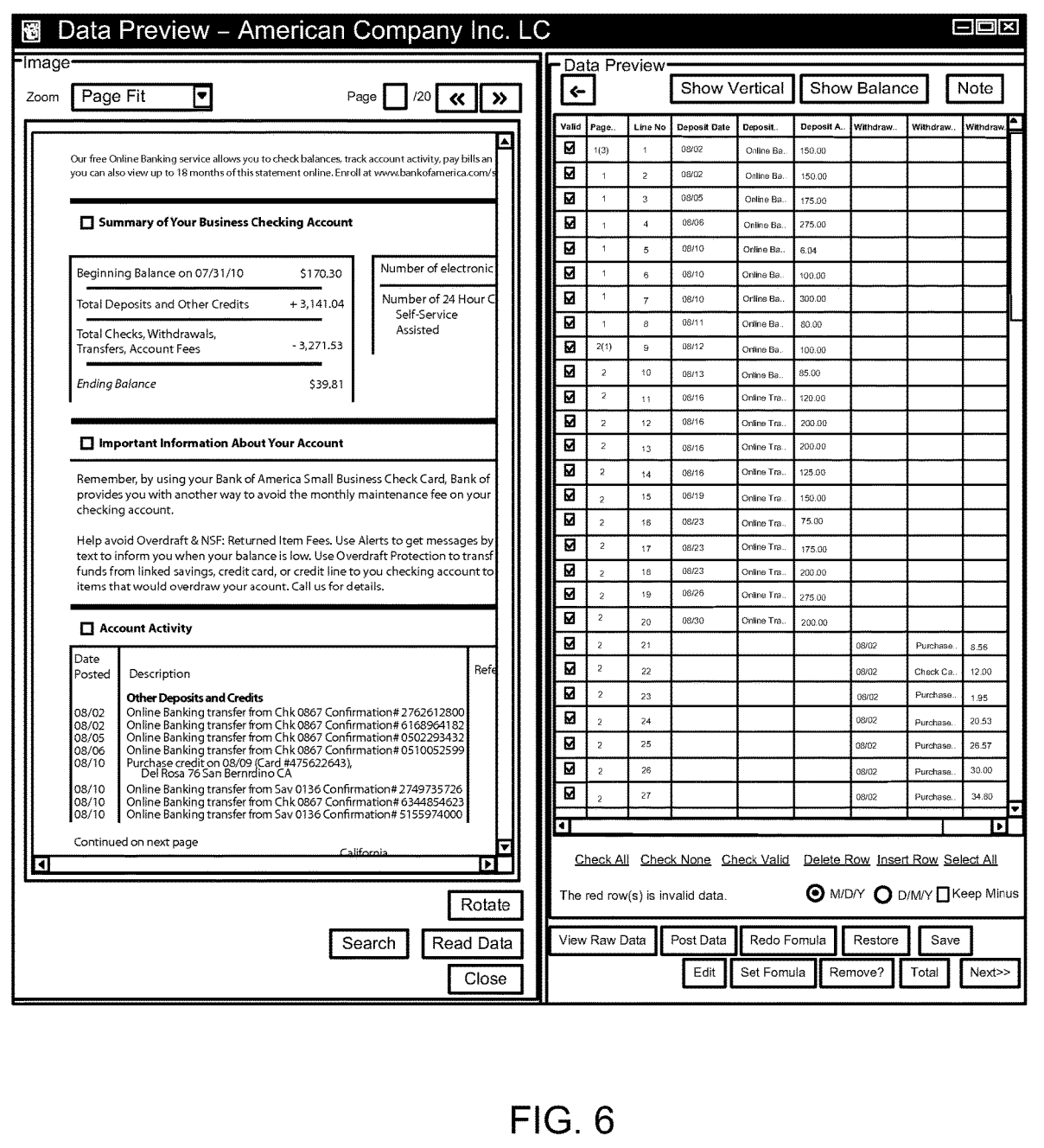

In reference to FIG. 5 and FIG. 6, following the extraction, the present invention automatically populates a financial datasheet using the financial transaction data from the image data. The financial datasheet is displayed in a data preview pane. The financial transaction data displayed by the financial datasheet allows the user to preview the extracted information from the paper financial document. The viewing pane displaying the image data and the data preview pane displaying the extracted financial transaction data are positioned side by side to provide easy comparison. And, the extracted data can be displayed in different color, such as red, blue, black, etc., depending upon the confidence level of the accuracy of the extraction. As a result, the user is able to refer to the image data displayed on the viewing pane to ensure the extracted financial transaction data is accurate. The user is provided with the means to modify the displayed view of the image data. In the preferred embodiment of the present invention, the view pane provides a zoom drop menu, a page selector, a search function, and a read function. The zoom drop menu provides the user with the ability to modify the zoom view of the image data. When the image data is displayed in an enlarged view, the user is able to pan the image to view a desired area. For the image data consisting of multiple pages, the user is able to select the page to be viewed by means of the page selector. The search function on the view pane provides users with the ability to look for and identify specific key words on the image data. The read function allows the user to initiate a new processing of the image data, wherein the financial data sheet is automatically repopulated from a new data extraction process. Given the enhanced ability to view the image data, the user is able to identify if there are any inconsistencies between the financial document and the extracted financial transaction data. In case there are any inconsistencies between the paper financial document and the financial transaction data displayed on the financial datasheet, the present invention provides the user with the ability to modify the financial datasheet. To do so, the user is able to individually select data cells and modify individual pieces of data. To identify the extracted data on the image data, the user is able to click on the cell of the financial datasheet. By clicking on the cell of the financial datasheet, the area in which the financial data was extracted from is boxed on the image data displayed in the viewing pane.

Figure 7:
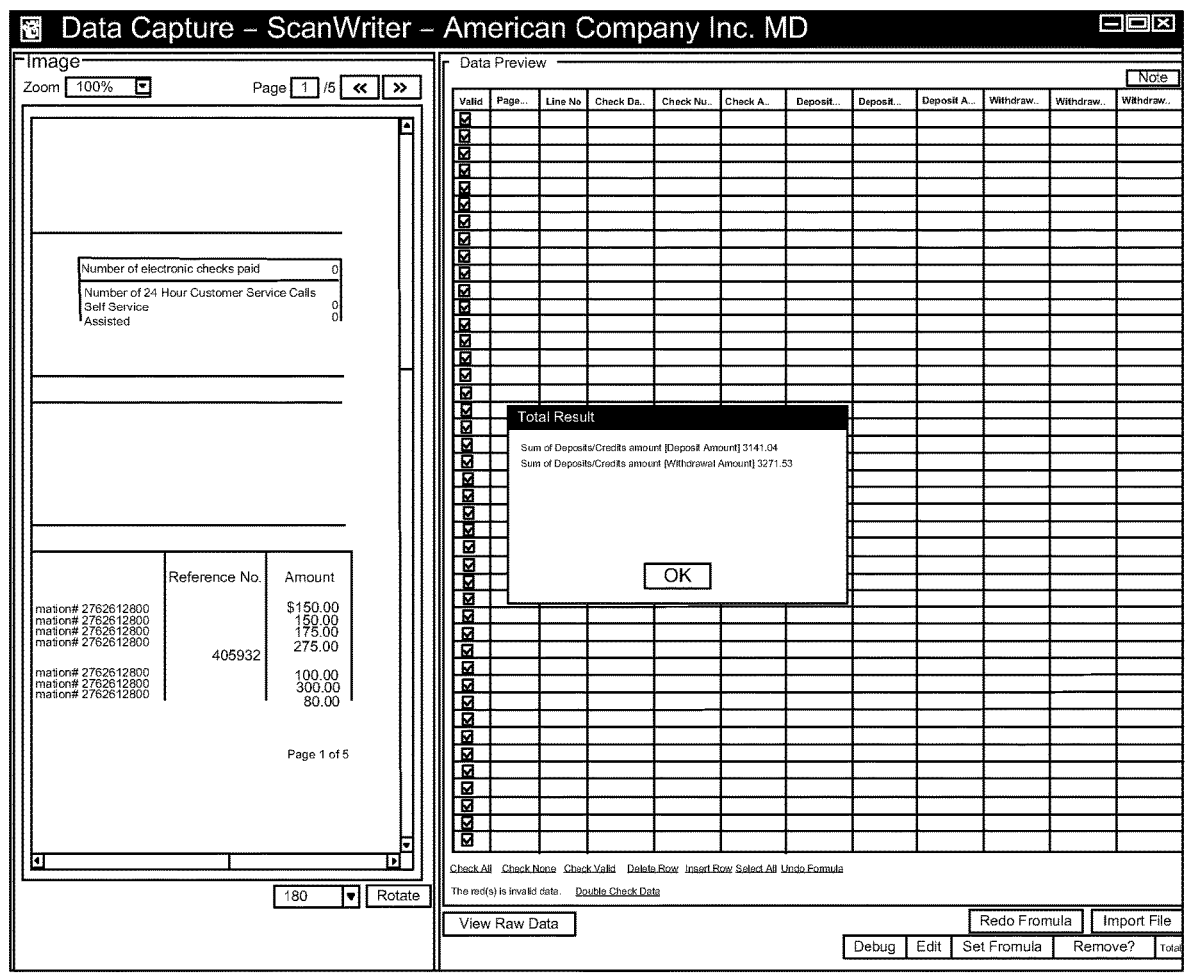
FIG. 7 shows the present invention's ability to provide a total calculation of the financial transactions related to the paper financial document.
Figure 10:
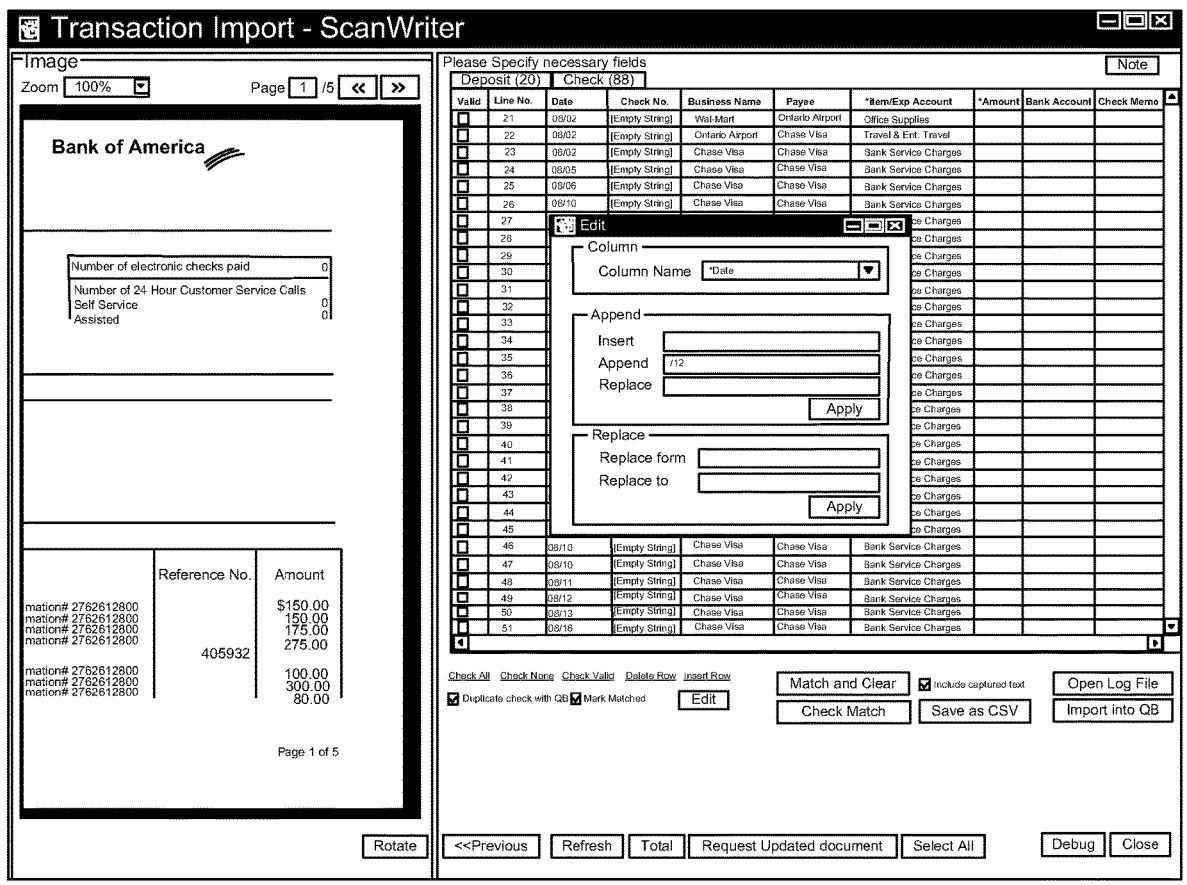
FIG. 10 is a view of the data preview pane providing the user with the means to edit the financial transaction data individually or by columns.
Figure 15:
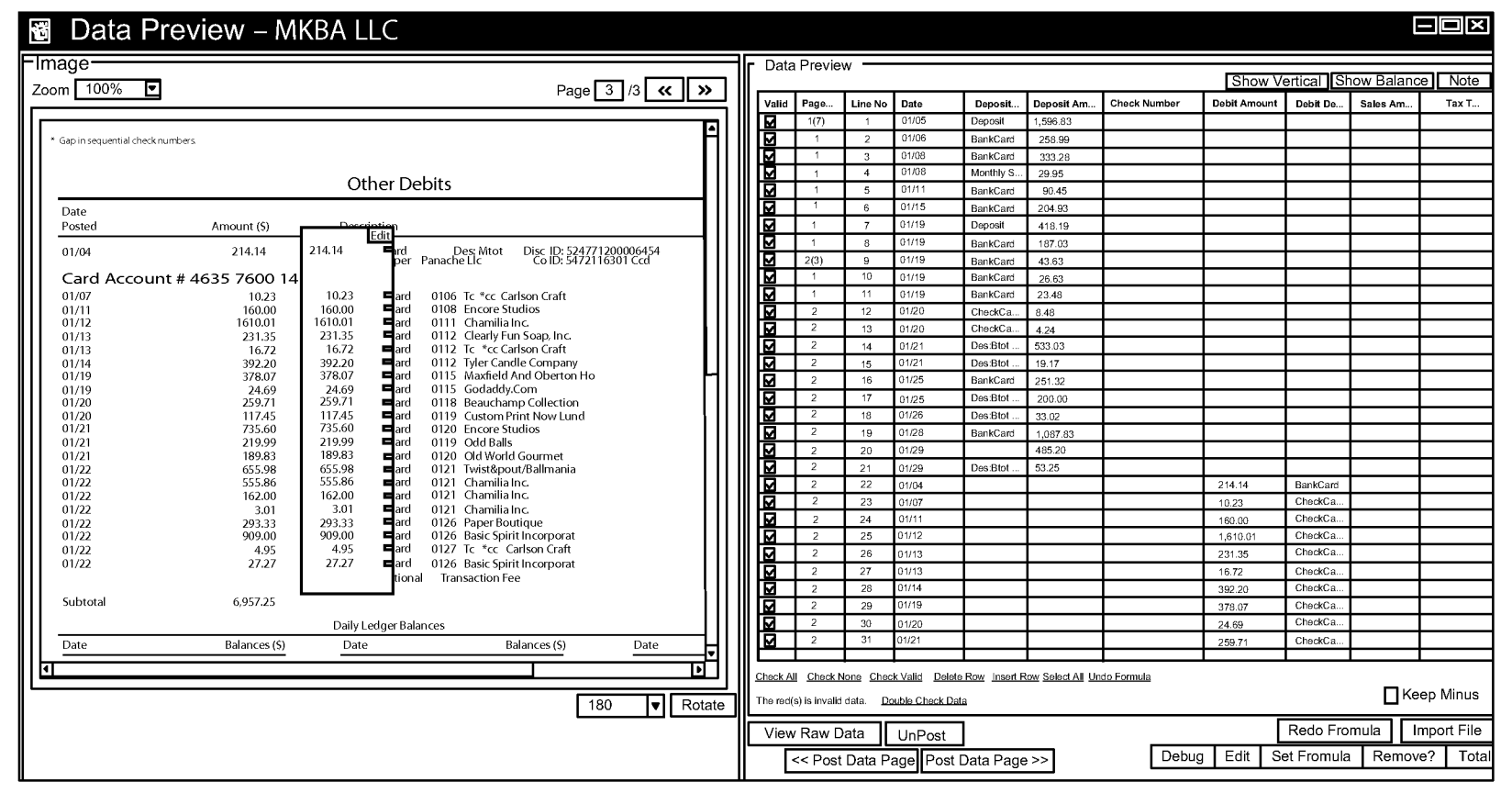

In reference to FIG. 7, the data preview pane provides the user with the ability to perform a calculation of the resulting total. The data preview pane consists of a total button which automatically calculates the sum of the credits/deposits and the sum of the checks/debts from the given financial transaction data. In the case the user notices the sum of the deposits and the sum of the credits do not add up to the correct amount, they are able to verify the data gathered by comparing the financial data sheet with the image data displayed in the viewing pane, as shown in FIG. 15. If necessary, the user may modify the extracted data via the edit button on the display pane. In reference to FIG. 10, any incorrectly extracted data can be individually modified by means of an edit button. The edit button provides the user with the means to edit the financial transaction data on the financial datasheet. If there is more than one incorrect data cell, the present invention provides the user with the ability to select a plurality of data cells for modification. However, to modify a plurality of data cells, each data cell must contain similar types of data. For example, if the plurality of data cells with the information of the transaction dates is incorrect and should be all the same value, the edit function allows the user to select the plurality of data cells to be modified together. However, if data cells of different types of data regarding the financial transaction are selected, the edit feature provides the user with drop down selection menu to pick which data needs to be modified. To modify the selected data cells, the user is provided with an append editor and a replacement editor. The append editor provides the user with the ability to add data to the existing data. For example, in many cases, the dates provided on a financial statement do not include the specific year with the associated financial transaction. The append editor provide the user with the ability to select a plurality of data cells for the dates and add on the year of the financial transactions. The replacement editor provides the user with the ability to completely replace data cells on the financial datasheet. The replacement editor allows the user to completely replace data that has been misread by the present invention to ensure accuracy.

Figure 9:
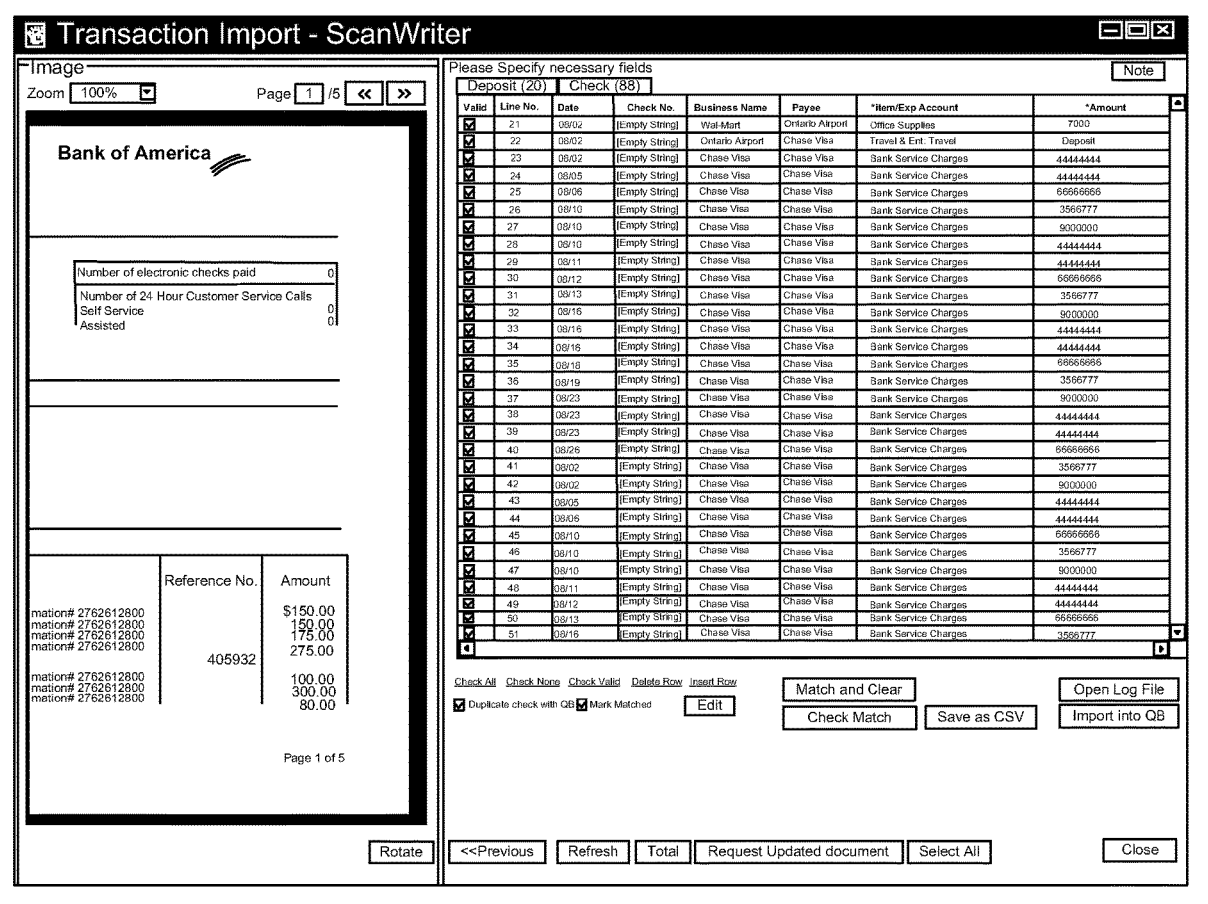
Figure 11:
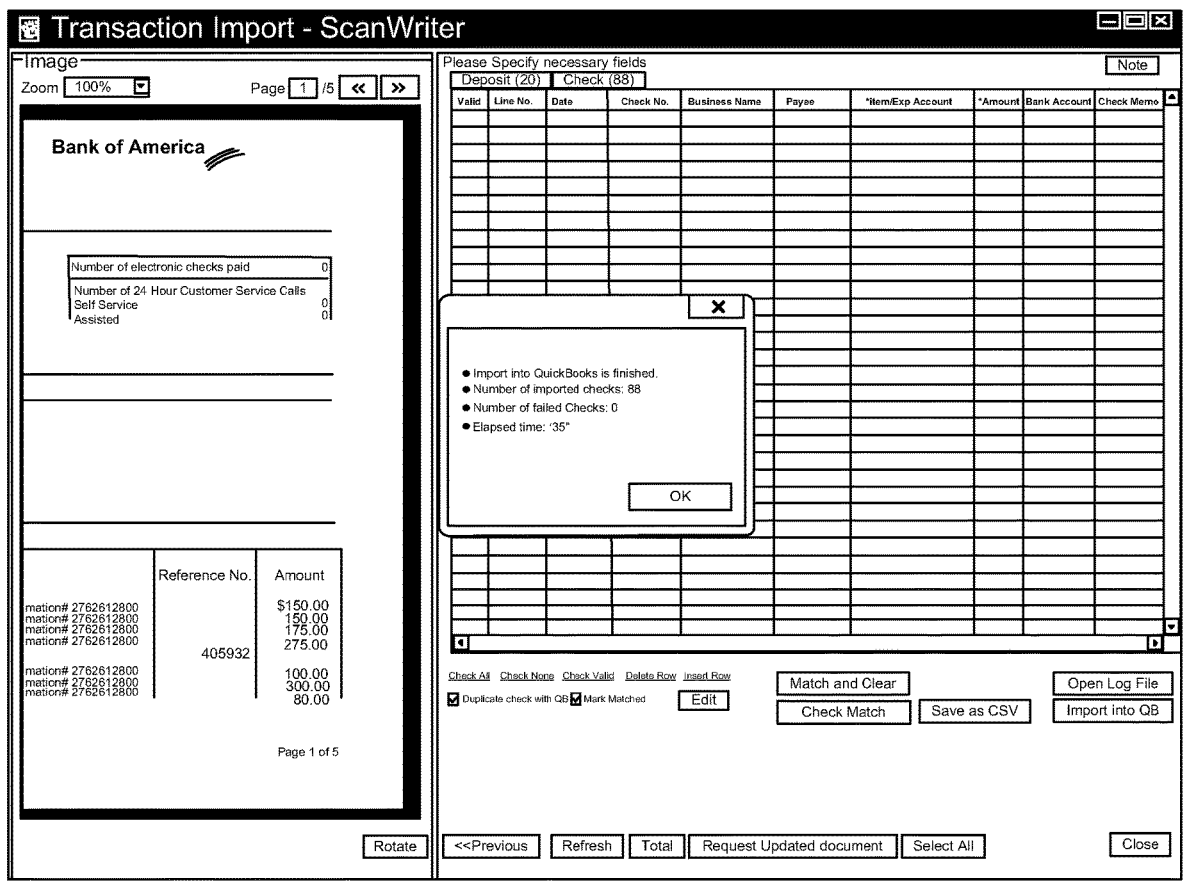
FIG. 11 shows the confirmation by the present invention of the statistics of an export to an external accounting software.
Figure 12:
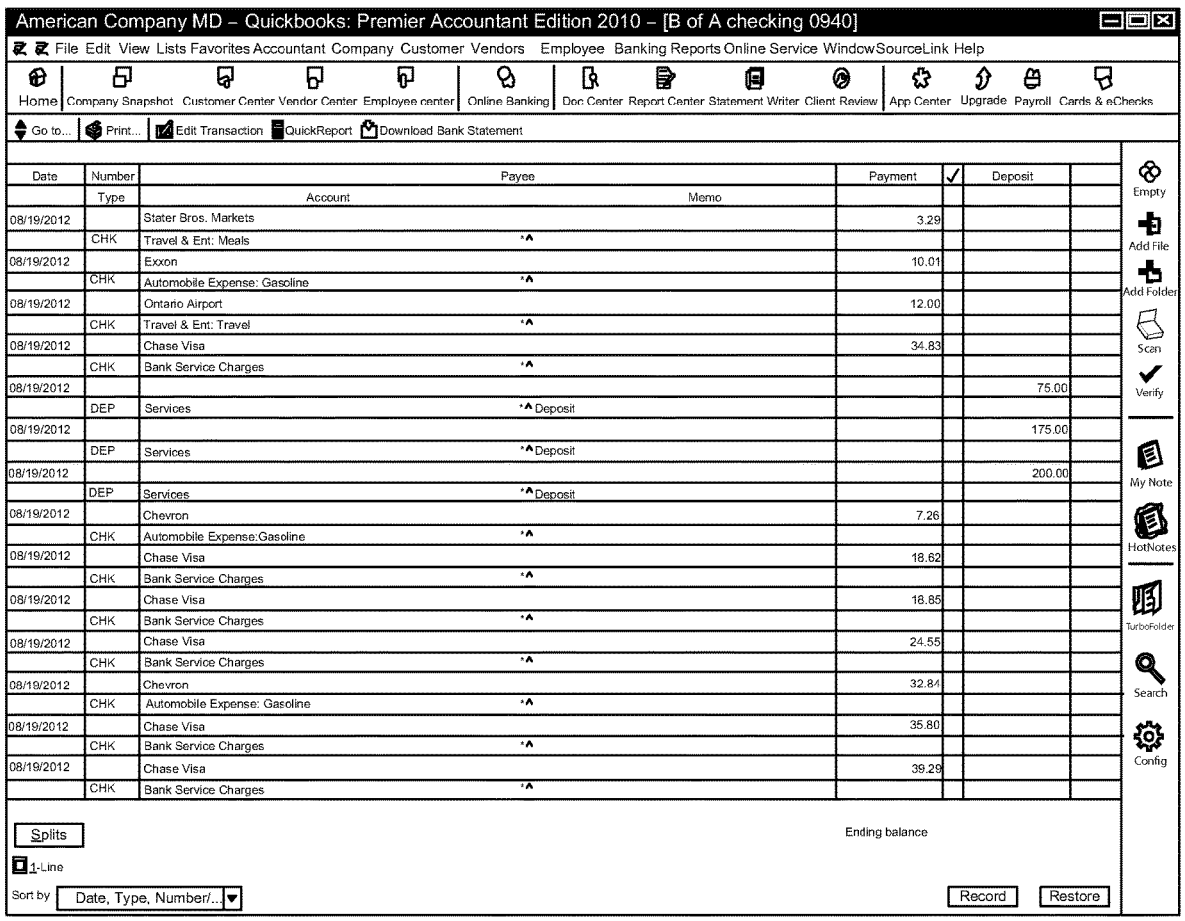
FIG. 12 shows the linking of the present invention with the external accounting software by means of the add on tool bar positioned on the right.

The present invention additionally provides the user with the means to split all of the financial transactions into two separate financial datasheets that are categorized depending on the types of financial transactions. As shown in FIG. 9, the financial transaction data displayed in the data preview pane are divided by financial transactions labeled as checks and deposits. The present invention provides the user with the means to export and update the company financial records with an external accounting program. For example, many businesses make use of the external accounting programs such as QuickBooks to keep track of any and all of their financial transactions. However, in order for every financial transaction to be properly exported to the external accounting program, each financial transaction is required to have specific data fields completed. The specific data fields for each financial transaction required by the external accounting software includes fields such as date, transaction amount, payee, and/or business name. Besides manually typing the required data, the existing data from the external accounting software can be retrieved and displayed as a drop down list for a simple click selection. And, additional rows can be inserted to provide more data for any single transactions. Provided all of the required data fields are completed, a check mark is presented for the financial transaction to confirm validity for synchronization and exportation to the external accounting software. In addition, prior to exporting the financial transaction data, the present invention is able to detect any duplication of financial transactions within the financial transaction data. In the case that a duplicate financial transaction is detected, the present invention displays a notification to inform the user of the duplicity. In reference to FIG. 9 and FIG. 11, once the user has completely ensured the accuracy of the financial transaction data, the financial data sheet is ready for export. The financial transaction data is exported into external accounting software for the updating of the company financial transaction records selected at the beginning of the process. The completion of the export displays a statistics report for the synchronization of the financial transaction data to the company financial records. The data shown on the statistics reports includes the number of financial transactions that were successfully exported, the number of financial transactions that failed to be exported, and the elapsed time for the synchronization.

In some cases, users do not make use of external accounting software, but make use of simple customizable spreadsheets to keep track of their financial records. The present invention provides the user with the means to export the financial datasheet to an external data file. The external data file is a tabular data file such as .CSV, text, .xls, or any other suitable tabular data file.

Figure 13:
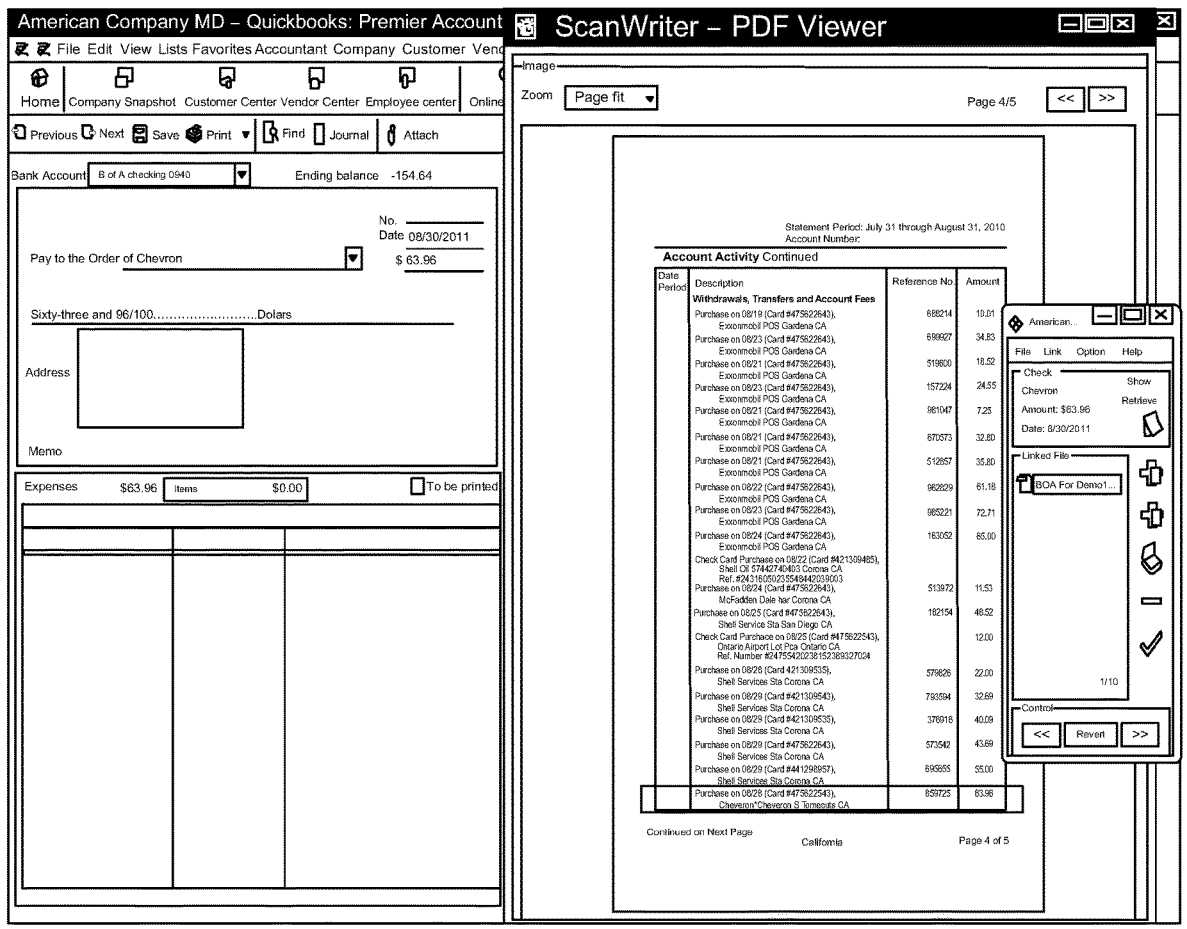
Figure 14:
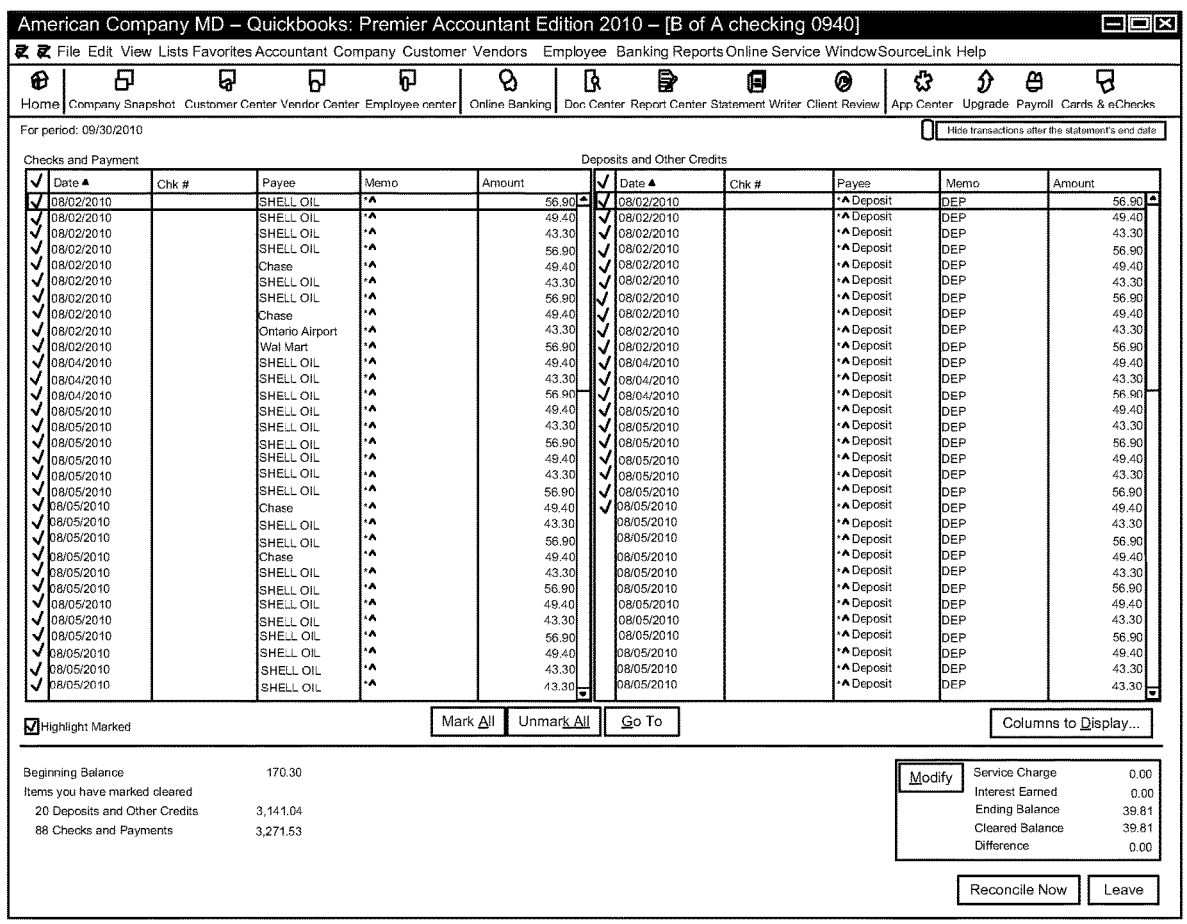
FIG. 14 shows the present invention providing the user with an auto-reconciliation function.

In reference to FIG. 13 and FIG. 14, the present invention can be linked with the external accounting software by means of an add-on toolbar. When viewing a company financial record, the user is able to view the details of the financial transaction within the external accounting software. With the linkage to the external accounting software through the add-on toolbar, the user is provided with the means to open and view the image data of the associated paper financial document for the financial transaction being viewed in detail. Additionally, the present invention is able to highlight the specified financial transaction on the displayed image data. The add-on toolbar provides the user the ability to directly interface with the present invention while operating the external accounting software. The add-on toolbar additionally provides a feature for auto-reconciliation to further check the accuracy of a company financial record.

Although the invention has been explained in relation to its preferred embodiment, it is to be understood that many other possible modifications and variations can be made without departing from the spirit and scope of the invention as hereinafter claimed.

What is claimed is:

1. A method of processing paper financial documents by executing computer-executable instructions stored in a non-transitory computer-readable medium of a computer, the method comprising:
receiving, by the computer, an image data file that has been generated based on scanning a paper financial document;
extracting, by the computer, financial transaction data from the image data file associated with the paper financial document, the extracting including identifying a plurality of numerical values displayed in the paper financial document;

automatically populating, by the computer, a financial datasheet that includes a plurality of cells, using the financial transaction data extracted from the image data file, the populating including placing each numerical value, of the plurality of numerical values, into a separate cell of the financial datasheet;

concurrently displaying, by the computer, (a) an image that represents the image data file and (b) the financial datasheet, including the plurality of cells that each include a particular numerical value extracted from the image data file,
wherein the financial datasheet is displayed in a manner that indicates a confidence level of the extracted financial transaction data,
wherein displaying the financial datasheet in the manner that indicates the confidence level of the extracted financial data includes using different colors, in the financial datasheet, to indicate different confidence levels of the extracted financial data;

receiving, by the computer, a selection of a particular cell, on the financial data sheet;

modifying the displaying of the image in response to receiving the selection of the particular cell on the financial data sheet, the modifying including highlighting, by the computer and while concurrently displaying the image and the financial datasheet, a particular area of the image that represents the image data file, the highlighted particular area being an area from which the particular numerical value, placed in the selected particular cell, was extracted; and exporting, by the computer, the financial datasheet to an external file that includes a tabular format data file.

2. The method of claim 1, further comprising:
providing an option to edit the financial transaction data on the financial datasheet after the extraction of the financial transaction data.

3. The method of claim 2, further comprising:
providing a plurality of templates; and
receiving a selection of a particular template, of the plurality of templates, wherein extracting the transaction data includes using the selected template to accurately extract the financial transaction data from the image data.

4. The method of claim 2, wherein the option to edit the financial transaction data includes:
an option to replace data in the particular selected cell, and
an option to append additional data to the data in the particular selected cell.

5. The method of claim 1, further comprising:
providing an option to modify a viewing zoom of the image data displayed,
wherein the image data includes a plurality of pages of the paper financial document; and
providing an option to view the plurality of pages of the paper financial documents individually.

6. The method of claim 1, wherein displaying the financial datasheet includes:
using different colors, in the financial datasheet, to indicate different confidence levels of the extracted financial data.

7. The method of claim 1, wherein the concurrently displaying includes:
displaying the image data of the paper financial document, including the highlighted particular area of the image data, in a first portion of a user interface; and
displaying the financial datasheet, including the selected particular cell, in a second portion of the user interface,
wherein the first and second portions of the user interface are different portions of the user interface.

8. A non-transitory computer-readable medium storing computer-executable instructions, which, when executed by a computer, cause the computer to:
extract financial transaction data from an image data file that corresponds to a previously scanned paper financial document, the extracting including identifying a plurality of numerical values displayed in the paper financial document;

automatically populate a financial datasheet that includes a plurality of cells, using the financial transaction data extracted from the image data file, the populating including placing each numerical value, of the plurality of numerical values, into a separate cell of the financial datasheet;

concurrently display (a) an image that represents the image data of the paper financial document and (b) the financial datasheet, including the plurality of cells that each include particular numerical value extracted from the image data file, on a same display screen,
wherein displaying the financial datasheet includes using different colors that each indicate a different confidence level of the extracted financial transaction data;

receive a selection of a particular cell, on the financial data sheet;

in response to receiving the selection of the particular cell, modify the display of the image data by highlighting, while concurrently displaying the image and the financial datasheet, a particular area of the image, the particular area being an area from which the particular numerical value, placed in the selected particular cell, was extracted; and export the financial datasheet to an external file that includes a tabular format data file.

9. The non-transitory computer-readable medium of claim 8, further comprising computer-executable instructions to:
provide an option to edit the financial transaction data on the financial datasheet after the extraction of the financial transaction data.

10. The non-transitory computer-readable medium of claim 9, further comprising computer-executable instructions to:
receive, via the option to edit a particular item of financial transaction data on the financial datasheet, an edit to the particular item; and
modify, based on the received edit, the particular item of financial transaction data on the financial datasheet.

* * * * *